(12) United States Patent
Nomura et al.

(10) Patent No.: US 7,895,748 B2
(45) Date of Patent: Mar. 1, 2011

(54) METHOD OF MOLDING A RESIN COATED BEARING, METHOD OF MANUFACTURING A RESIN COATED BEARING, AND A RESIN COATED BEARING MOLDED BY THE MOLDING METHOD

(75) Inventors: Takumi Nomura, Inuyama (JP); Hiroshi Naito, Inuyama (JP); Yoshichika Ito, Toyoake (JP); Hiroshi Ishihara, Anjo (JP); Shuichi Matsumoto, Matsusaka (JP); Terumitsu Tanio, Matsusaka (JP)

(73) Assignees: Daido Metal Company Ltd., Nagoya (JP); Sunhill Inc., Mie (JP)

( * ) Notice: Subject to any disclaimer, the term of this patent is extended or adjusted under 35 U.S.C. 154(b) by 1174 days.

(21) Appl. No.: 11/580,008

(22) Filed: Oct. 13, 2006

(65) Prior Publication Data

US 2007/0085239 A1    Apr. 19, 2007

(30) Foreign Application Priority Data

Oct. 14, 2005    (JP)    ................... 2005-299514

(51) Int. Cl.
*B21D 53/10*    (2006.01)

(52) U.S. Cl. ............... 29/890.049; 29/898; 29/898.05; 29/898.055; 29/527.1; 29/527.5; 29/527.6; 29/530; 264/299

(58) Field of Classification Search .......... 29/898, 29/898.049, 898.05, 898.055, 898.066, 898.067, 29/527.1, 527.5, 527.6, 530; 264/154, 155, 264/161, 279, 299
See application file for complete search history.

(56) References Cited

U.S. PATENT DOCUMENTS 5,728,343 A * 3/1998 Ueno ..................... 264/275

FOREIGN PATENT DOCUMENTS

JP    08-142112    6/1996
JP    2003-176661    6/2003

OTHER PUBLICATIONS

Machine Translation of JP2003-176661, 2003.*

* cited by examiner

*Primary Examiner*—David P Bryant
*Assistant Examiner*—Ryan J Walters
(74) *Attorney, Agent, or Firm*—Browdy and Neimark, PLLC (57) ABSTRACT

Disclosed is a method of molding a resin coated bearing. When a molten resin is injected toward a substantially central portion of a disk space of forming dies from a sprue formed on an upper die, the molten resin is filled into a cavity through a film gate after the molten resin is led to the disk space from a pin gate, so that any weld is absent on a resin member, which covers an outer race, thus enabling uniformizing a coating member in resin strength and suppressing generation of crack on the coating member even at the time of high loading. Also, since the film gate formed on a whole peripheral edge of the disk space is formed from a lower die and an upper die, there is an advantage that after working suffices to take out a resin coated bearing from the both dies and to cut a runner in the disk space.

3 Claims, 5 Drawing Sheets

METHOD OF MOLDING A RESIN COATED BEARING, METHOD OF MANUFACTURING A RESIN COATED BEARING, AND A RESIN COATED BEARING MOLDED BY THE MOLDING METHOD

BACKGROUND OF THE INVENTION

The present invention relates to a method of molding a resin coated bearing, in which method a coating member made of a synthetic resin is insert-molded onto an outer peripheral surface of a metallic outer race of a ball bearing, a method of manufacturing a resin coated bearing, and a resin coated bearing molded by the molding method.

Conventionally, there is, for example, a guide roller for vehicular sliding doors, to which a resin coated bearing is applied. By the way, with vehicular sliding doors, an upper guide roller provided on an upper portion of a front end of a sliding door, a center guide roller provided centrally of a rear end in a heightwise direction, and a lower guide roller provided on a lower portion of the front end are caused to engage rollingly with an upper rail provided on an upper edge of an opening of a vehicle body, a center rail provided centrally of a rear side wall of the vehicle body adjacent to the opening of the vehicle body in the heightwise direction, and a lower rail provided on a lower edge of the opening of the vehicle body to support the sliding door slidably along a side wall of the vehicle body, thus enabling sliding the sliding door to open and close.

JP-A-2003-176661 shows an example, in which a bearing type roller with a synthetic resin coated on an outer periphery of an outer race is used as a guide roller for sliding doors. For the reason why such bearing type guide roller is used, there is a disadvantage that in the case where a guide roller constructed as a resin solid roller with a small number of parts is used, the resin solid roller is abraded locally by a load of a sliding door and smooth rotation is obstructed whereby the resin solid roller is broken and the sliding door comes off a vehicle body in the worst case. On the other hand, since at least a structure of a roller in a bearing type guide roller comprises an outer race made of metal (bearing steel), there is an advantage that the roller itself is hard to crack and a sliding door is hard to come off a vehicle body even when a resin part is broken.

However, the resin coated bearing shown in JP-A-2003-176661 is not described in detail but as far as the specification and drawings (FIG. 4) thereof are referred to, it is found that there is involved a disadvantage that since in insert-molding of a synthetic resin onto an outer race of the bearing, the plural point gate system (for example, three point gate system) is used to inject a molten resin into a cavity of forming dies, a weld portion (a portion where molten resins injected from different gates combine together in the cavity) is reduced in strength and generation of crack starts from the weld portion at the time of high loading. Hereupon, it is conceivable to insert-mold a synthetic resin onto an outer race of a bearing in the film gate system shown in, for example, JP-A-08-142112.

BRIEF SUMMARY OF THE INVENTION

However, insert-molding with the film gate system shown in JP-A-08-142112 involves a disadvantage that since a dummy shaft is arranged in a cavity, there is a need of removing a runner together with the dummy shaft when the runner is to be removed in an after treatment after molding, so the after treatment is troublesome and the presence of the dummy shaft makes a cut face of a film gate unstable with the result that burr is easily generated. The invention has been thought of in view of the situation and has its object to provide a method of molding a resin coated bearing, in which method a coating resin is made uniform in strength by eliminating a weld portion at the time if insert-molding and generation of burr can be suppressed at the time of after treatment after molding, a method of manufacturing a resin coated bearing, and a resin coated bearing molded by the molding method.

Thus, according to a first aspect of the invention, there is provided:

a method of molding a resin coated bearing, in which a coating member of a synthetic resin is formed on an outer peripheral surface of a metallic outer race of a ball bearing by insert-molding, wherein after a hole defined by an inner peripheral surface of the outer race is fitted onto a columnar portion provided on a first die of forming dies, a second die of the forming dies is brought to cover the first die so that:

a cavity is defined by an outer periphery of the outer race, the first and second dies;

a disk space in the form of a disk as viewed in plan view is defined between the columnar portion of the first die and the second die at the time of such covering; and a film gate is defined to provide communication between a whole edge of an outer periphery of the disk space and the cavity, and wherein a molten resin is filled into the cavity through the film gate after the molten resin is led to the disk space from a pin gate, which is formed at a lower end of a sprue formed on the second die when the molten resin is injected toward a substantially central portion of the disk space from the sprue.

According to a second aspect of the invention, there is provided a method of producing a resin coated bearing, in which the outer race produced by the above method of molding, wherein after the outer race provided with the coating member of the synthetic resin is taken out of the forming dies, a disk runner part of the synthetic resin filled in the disk space is cut by an exclusive jig at the film gate to be removed, and thereafter the outer race is fitted onto an inner ring with bearing balls therebetween.

According to a third aspect of the invention, there is provided a resin coated bearing produced by the above first method, wherein an outer peripheral surface of the outer race opposed to the coating member made of the synthetic resin is shaped such that a flange is formed on one end side of the outer peripheral surface, a plurality of coming-off preventive recesses are formed in distant positions on a bottom surface extending from an inner, lower portion of the flange to the other end side of the outer peripheral surface, a round-shaped projection is formed between the coming-off preventive recesses, and another projection is formed on the other end side of the outer peripheral surface to define the film gate.

According to a first embodiment of the resin coated bearing, a sealing fitting recess, into which a sealing member is to be fitted, is formed on an inner peripheral surface of the outer race corresponding to the projection on the other end side of the outer peripheral surface and a projecting height of an outer projection of the sealing fitting recess is smaller than a half of a depth of the sealing fitting recess.

According to a second embodiment of the resin coated bearing, the coating member is made of a fiber reinforced synthetic resin, which is obtained by mixing a main component of 46 nylon having a high softening temperature with carbon fibers.

According to a third embodiment of the resin coated bearing, the resin coated bearing is used for a guide roller of a vehicular sliding door, which rolls on a rail provided on a side of a vehicle body.

With regard to the first aspect of the invention, since a molten resin is filled into the cavity through the whole circular film gate, so that any weld is absent on the coating member, which is made of a synthetic resin and covers an outer race, thus enabling uniformizing the coating member in resin strength and suppressing generation of crack on the coating member also at the time of high loading. Also, since the film gate formed at a whole peripheral edge of the disk space is formed from the first die and the second die, there is an advantage that after working suffices to take out a resin coated bearing from the both dies and to cut a runner in the disk space.

With regard to the second aspect of the invention, a resin coated bearing can be simply manufactured by using an exclusive jig to cut a runner (disk runner) filled in the disk space at the film gate, and thereafter fitting the inner ring with a bearing therebetween.

With regard to the third aspect of the invention, since adherence of the coating member to the outer race can be heightened by the plurality of coming-off preventive recesses formed on the outer peripheral surface of the outer race and the round-shaped projection between the coming-off preventive recesses and an applied load stress can be dispersed by the round-shaped projection, the coming-off preventing function of the coating member can be considerably heightened as a whole. Also, the projection formed on the other end side of the outer peripheral surface of the outer race makes it possible to cut the runner filled in the disk space at the film gate in a manner to eliminate generation of burr.

With regard to the first embodiment of the invention, since a projecting height of the outer projection of the sealing fitting recess formed on the inner peripheral surface of the outer race corresponding to the projection of the outer race is smaller than a half of a depth of the sealing fitting recess, a resin filled in the sealing fitting recess when a molten resin is filled is removed simultaneously when a runner filled in the disk space is cut at the film gate, so that after working is made easy.

With regard to the second embodiment of the invention, since the coating member is made of a fiber reinforced synthetic resin, which is obtained by mixing a main component of nylon having a high softening temperature with carbon fibers, it is possible to restrict elongation of the coating member whereby it is possible to further surely prevent the coating member from coming off the outer race.

With regard to the third embodiment of the invention, it is possible to maintain smooth opening and closing of a sliding door over a long term when the resin coated bearing is used for a guide roller of a vehicular sliding door.

DETAILED DESCRIPTION OF THE INVENTION

Figure 1:
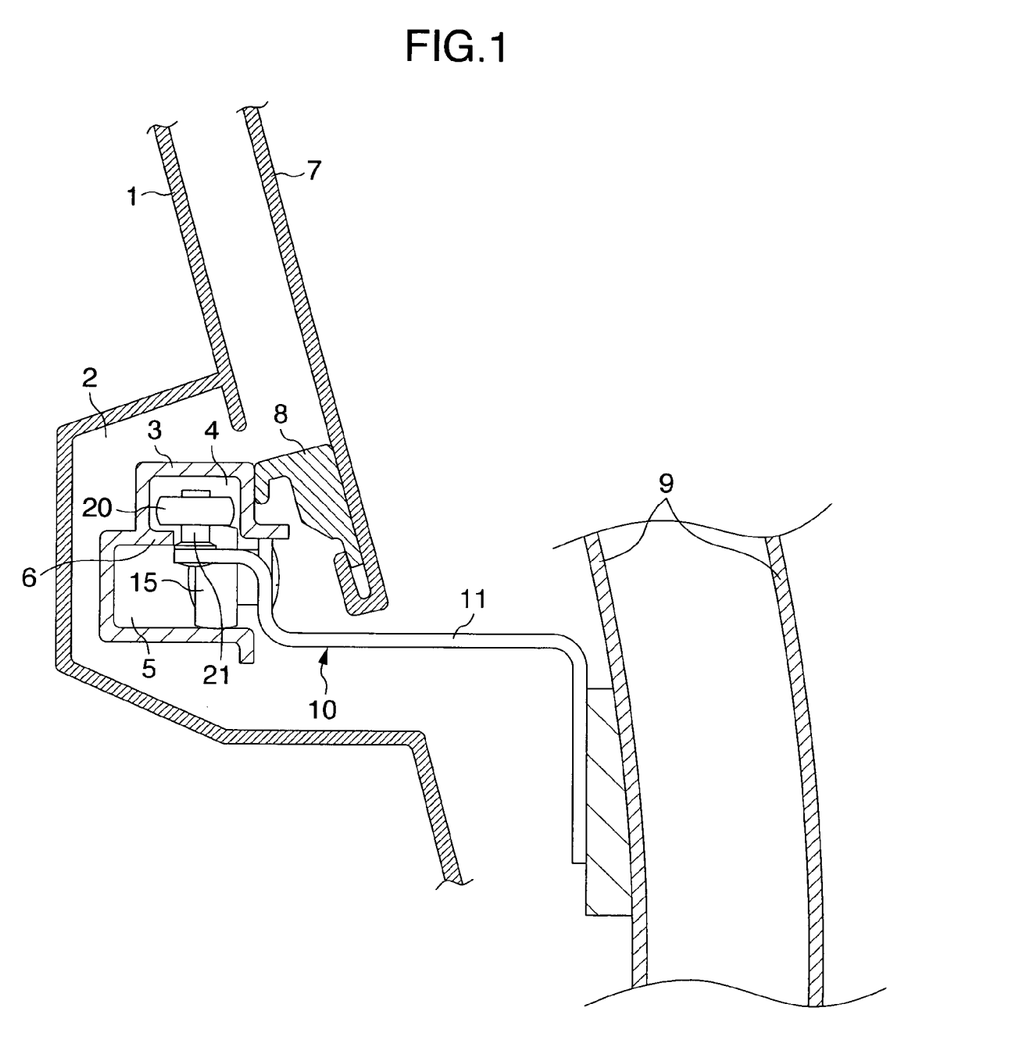
FIG. 1 is a cross sectional view showing a center rail part, to which a resin coated bearing according to an embodiment is applied.
Figure 2A:
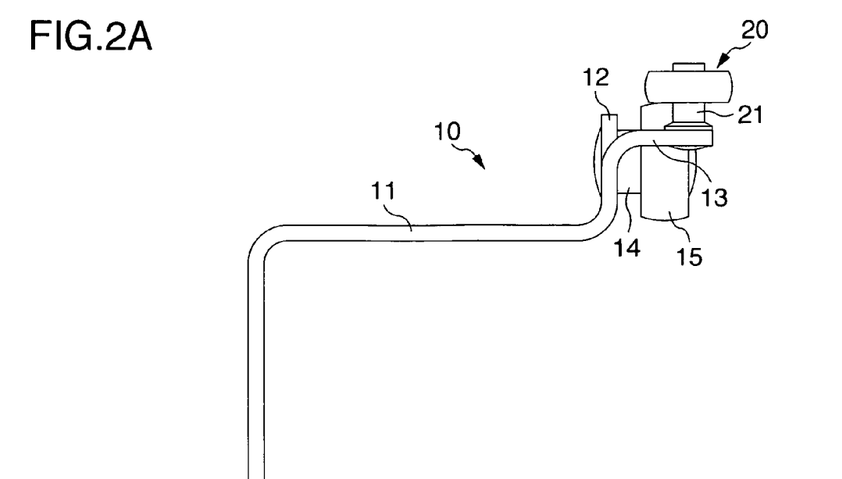
FIG. 2A is a schematic front view showing a center guide roller mechanism, to which the resin coated bearing is applied.
Figure 2B:
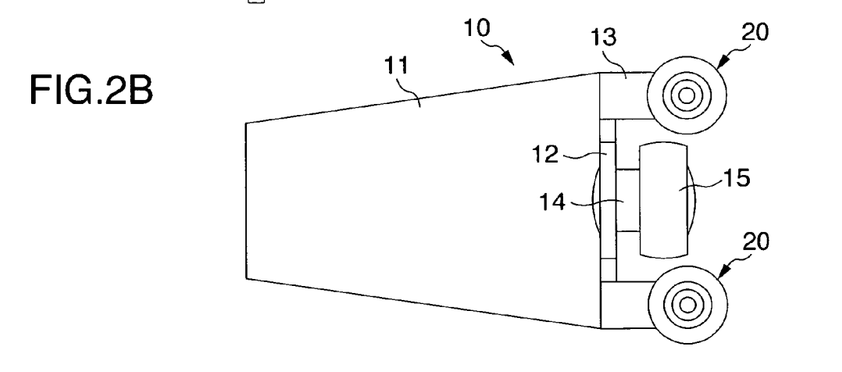
FIG. 2B is a schematic plan view of the center guide roller mechanism.
Figure 2C:
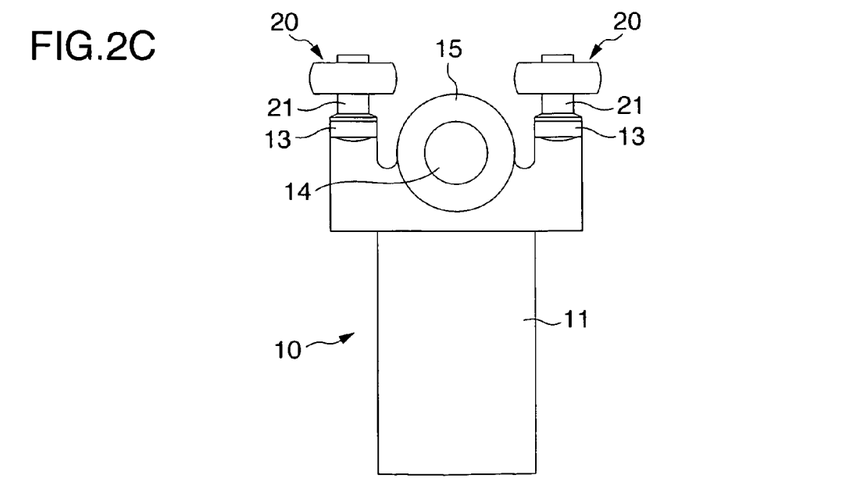
FIG. 2C is a schematic right side view of the center guide roller mechanism.
Figure 3:
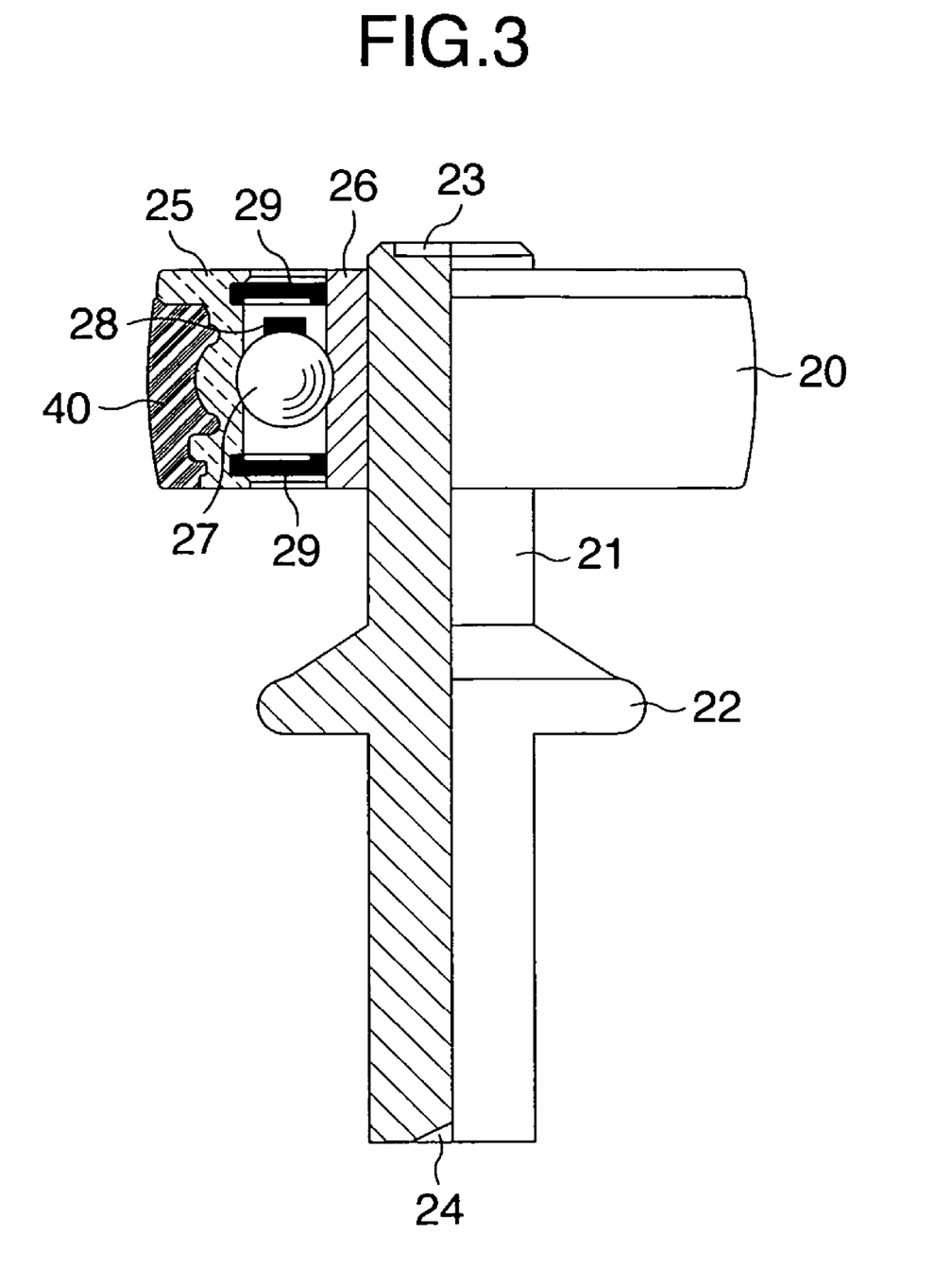
FIG. 3 is a partially fragmentary, front view showing an internal structure of the resin coated bearing.

Referring to FIGS. 1 to 3, an explanation will be provided below to an embodiment of a resin coated bearing for vehicular sliding doors, to which resin coated bearings 20 according to the invention are applied. FIG. 1 is a cross sectional view showing a center rail part, to which the resin coated bearings 20 according to the embodiment are applied, FIGS. 2A, 2B and 2C are a front view, a plan view, and a right side view showing the outline of a center guide roller mechanism 10, to which the resin coated bearings 20 are applied, and FIG. 3 is a partially fragmentary, front view showing an internal structure of the resin coated bearing 20.

With a vehicular sliding door, as described above, an upper guide roller provided on an upper portion of a front end of a sliding door, a center guide roller provided centrally of a rear end in a heightwise direction, and a lower guide roller provided on a lower portion of the front end are caused to engage rollingly with an upper rail provided on an upper edge of an opening of a vehicle body, a center rail provided centrally of a rear side wall of the vehicle body adjacent to the opening of the vehicle body in a heightwise direction, and a lower rail provided on a lower edge of the opening of the vehicle body to support the sliding door slidably along a side wall of the vehicle body, thus enabling sliding the sliding door to open and close. According to an embodiment shown in the drawings, a resin coated bearing according to the invention is applied to the center guide roller mechanism 10.

As shown in FIG. 1, a center rail 3 is mounted in a recess 2, which is provided on a rear side wall of a vehicle body outer plate 1 to be substantially C-shaped in cross section with an opening thereof opened laterally. The center rail 3 is formed so that an upper guide roller chamber 4, in which the resin coated bearings 20 as guide rollers are accommodated, and a support roller chamber 5, in which a support roller 15 is accommodated, are communicated vertically to each other. A partition, projecting piece 6 is provided to project inward from one of side walls, which partition the guide roller chamber 4 and the support roller chamber 5. The partition, projecting piece 6 prevents the resin coated bearings 20 from coming off the center rail 3, thus consequently preventing a sliding door 9 from coming off. In addition, the recess 2 is covered by a detachable center rail cover 7, and a spacing holding member 8 is fixed to an inside of a lower end of the center rail cover 7 to abut against the center rail 3 to keep a spacing.

The support roller 15 and the resin coated bearings 20 in the center guide roller mechanism 10 engage with the center rail 3, which is formed in a manner described above, to be able to roll and are connected to the sliding door 9 through a support member 11 of the center guide roller mechanism 10. Here, the center guide roller mechanism 10 will be described with reference to FIGS. 1 and 2.

The center guide roller mechanism 10 comprises the support member 11 formed to be crank-shaped, and the support roller 15 and the resin coated bearings 20, which are mounted to a support roller mount piece 12 and a guide roller mount piece 13, which are formed on an upper portion of an end of the support member 11. More specifically, one end side (upper end side) of the support member 11 stands in a vertical direction, an upright, central portion makes the support roller mount piece 12, and both upright, left and right sides are provided protrusively in a horizontal direction to form the guide roller mount piece 13. Caulked and fixed to the support roller mount piece 12 is a support shaft 14, which rotatably journals the support roller 15. Also, caulked and fixed to the guide roller mount piece 13 are support shafts 21, which rotatably journal the resin coated bearings 20. On the other hand, the other end side of the support member 11 is suspended downward to make a mount piece for connection to the sliding door 9.

With the center guide roller mechanism 10 constructed in the manner described above, the support roller 15 is accommodated in the support roller chamber 5 of the center rail 3 to abut against and roll on a bottom surface of the support roller chamber 5 as the sliding door 9 moves slidingly, and the resin coated bearings 20 are accommodated in the guide roller chamber 4 of the center rail 3 to abut against and roll on left and right sides of the guide roller chamber 4 as the sliding door 9 moves slidingly. In addition, the support roller 15 comprises a bearing type roller, an outer periphery of which is covered by a coating member made of a synthetic resin or rubber but may be structured in the same manner as the resin coated bearings 20, which constitute the gist of the invention.

Subsequently, a detailed structure of the resin coated bearing 20 will be described mainly with reference to FIG. 3. The resin coated bearing 20 comprises a support shaft 21 caulked and fixed to the guide roller mount piece 13 of the support member 11, a ring-shaped inner ring 26 mounted to the support shaft 21, a ring-shaped outer race 25 arranged to surround an outer periphery of the inner ring 26 with a plurality of bearing balls 27 therebetween, and a coating member 40 made of a synthetic resin to cover an outer peripheral surface of the outer race 25.

The support shaft 21 is made of a cylinder member of medium carbon steel (for example, JIS S35C) and formed at a substantially intermediate portion thereof with an interposing projection 22, which abuts against the guide roller mount piece 13 when the guide roller mount piece is caulked and fixed thereto, and at upper and end surfaces thereof with caulking recesses 23, 24, against which a push member for caulking abuts. In this manner, the support shaft 21 is made of medium carbon steel whereby the support shaft 21 is made liable to be caulked and fixed to the guide roller mount piece 13. Further, the whole support shaft 21 is subjected to rust-proofing with manganese phosphate.

The ring-shaped inner ring 26 of the resin coated bearing 20 is fitted onto the support shaft 21. Formed vertically centrally of the inner ring 26 is an arcuate-shaped track recess (not denoted by any reference numeral), against which the bearing balls 27 abut. The track recess is subjected to induction hardening. In this manner, the track recess, of which wear is expected, is subjected to induction hardening to posses durability to friction and wear caused by the bearing balls 27. In addition, the hardness of the track recess is made 700 Hv or more by application of induction hardening.

The plurality of bearing balls 27 are arranged at equal intervals between the inner ring 26 and the outer race 25 by a retainer 28. A grease oil is applied between the bearing balls 27. Also, as shown in FIG. 4B, the ring-shaped outer race 25 arranged in a manner to surround the outer periphery of the inner ring 26 is formed at an inner peripheral surface thereof with an arcuate-shaped track recess 36, against which the bearing balls 27 abut, and sealing fitting recesses 35, 37, into which rubber sealing rings 29 (sealing members) for closure of upper and lower end surfaces of the inner ring 26 and the outer race 25 are fitted, and on one end side (an upper end of the outer peripheral surface as viewed in FIG. 3) of the outer peripheral surface thereof with a flange 30. Also, formed on the outer peripheral surface of the outer race 25 are coming-off preventive recesses 31 in two distant locations on a bottom surface extending from an inner, lower portion of the flange 30 to the other end side of the outer peripheral surface to engage with the coating member 40, a round-shaped R projection 32 projecting from between the coming-off preventive recesses 31, a projection 34 positioned on the other end side of the outer peripheral surface, and a small flange 33 projecting from between the projection 34 and the coming-off preventive recess 31 close to the other end side. In addition, the outer race 25 is made of bearing steel (for example, JIS SUJ-2) and wholly subjected to vacuum hardening. In this manner, the outer race 25 is wholly subjected to vacuum hardening whereby the hardness of the track recess 36 is made HRc 58 to 65, so that the track recess possesses durability to friction and wear caused by the bearing balls 27.

With the outer race 25 structured in the manner described above, the coating member 40 covering the outer race 25 can be increased in adherence to the outer race 25 by the two coming-off preventive recesses 31 formed on the outer peripheral surface of the outer race 25 and the round-shaped R projection 32 between the coming-off preventive recesses 31 and an applied load stress can be dispersed by the round-shaped R projection 32, so that it is possible to considerably heighten the coming-off preventing function of the coating member 40 as a whole. Also, the projection 34 formed on the other end side of the outer peripheral surface of the outer race 25 makes it possible to cut a runner 42, which is filled in a disk space 53 described later, at a film gate 54 in a manner to eliminate generation of burr.

The coating member 40 made of a synthetic resin to cover the outer peripheral surface of the outer race 25 is made of a fiber reinforced synthetic resin, which is obtained by mixing a main component of 46 nylon, which is higher in softening temperature than 66 nylon, with special fibers, such as carbon fibers, etc. of 15 wt % (desirably, 7 to 12 wt %). The coating member 40 is provided by means of insert molding as described later in detail in a manner to cover the outer peripheral surface of the outer race 25. Since an upper end of the coating member 40 is latched on the flange 30 and the coating member 40 engages with the coming-off preventive recesses 31 when the coating member 40 covers the outer race, the coating member 40 made of a synthetic resin is prevented from coming off the outer race 25 and it is possible to suppress elongation and heighten strength because the coating member 40 made of a synthetic resin is made of a fiber reinforced synthetic resin, which is obtained by mixing a main component of 46 nylon, which is high in softening temperature, with special fibers, so that coming-off of the coating member 40 made of a synthetic resin from the outer race 25 can be further prevented and besides temperature at the time of ED coating does not make that portion of the coating member 40 made of a fiber reinforced synthetic resin, which abuts against the guide rail, a flat surface. Therefore, it is possible to maintain smooth movement of the sliding door 9 over a long term.

Further, the flange 30 formed at the upper end of the outer peripheral surface of the outer race 25 is not covered by the coating member 40 but can abut against the left and right sides of the guide roller chamber 4. Therefore, even when the coating member 40 breaks, the flange 30 made hard to wear, by vacuum hardening interferes with the left and right sides to further surely prevent the resin coated bearings 20 from coming off the guide roller chamber 4 and hence to prevent the center guide roller mechanism 10 from coming off the center rail 3 to permit the sliding door 9 to come off a vehicle body.

In a state, in which the resin coated bearings 20 shown in FIG. 3 is assembled, an upper end of the support shaft 21 projects above (upward in FIG. 3) from the upper end surface of the outer race 25. In this case, when the resin coated bearing 20 is to be mounted to the guide roller mount piece 13, the support shaft 21 can be held by a jig or the like in a state, in which the outer race 25 is arranged on the support shaft 21. Thereby, it is possible to caulk and fix the support shaft 21 to the guide roller mount piece 13 and to mount the resin coated bearing 20 to the guide roller mount piece 13 by means of a relatively ready fixing structure.

Figure 4A:
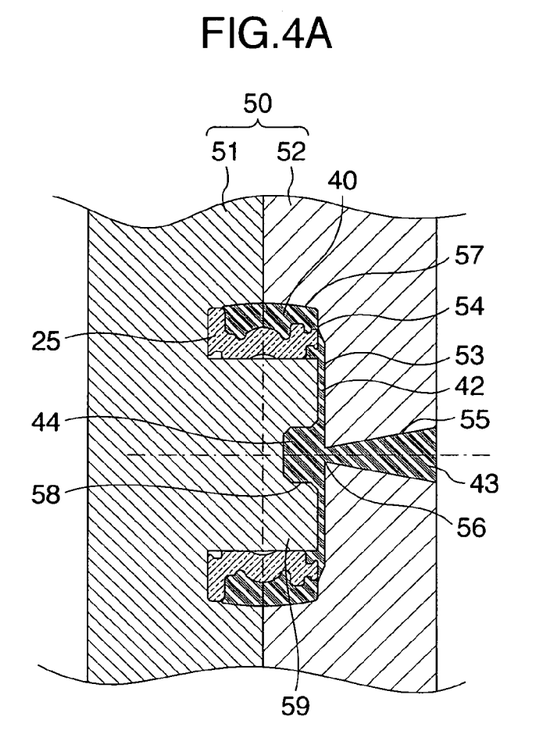
FIG. 4A is a cross sectional view showing forming dies for molding of a resin coated bearing.
Figure 4B:
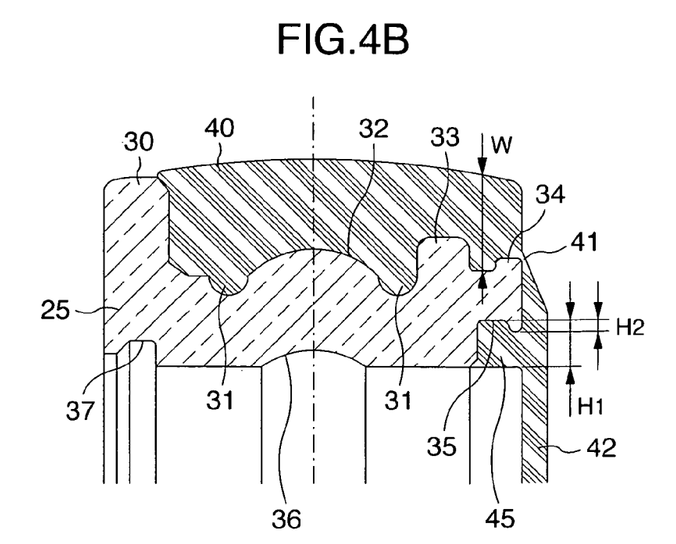
FIG. 4B is an enlarged view showing a part of a molding.

In order to insert-mold the coating member 40 into the outer race 25 of the resin coated bearing 20 described above, forming dies 50 is used to comprise a lower die 51 provided with a columnar portion 59, which is fitted into a hole formed on an inner peripheral surface of the outer race 25, and an upper die 52, which covers the lower die 51, as shown in FIG. 4A. Thus, after the hole formed on the inner peripheral surface of the outer race 25 is mounted in a manner to be fitted onto the columnar portion 59 provided on the lower die 51, the upper die 52 is brought to cover the lower die 51 so that a cavity 57 is defined by the outer periphery of the outer race 25, the lower die 51, and the upper die 52, a disk space 53 in the form of a disk as viewed in plan view is defined between the columnar portion 59 of the lower die 51 and the upper die 52, a film gate 54 is defined to provide communication between a whole edge of an outer periphery of the disk space 53 and the cavity 57, and a molten resin is injected toward a substantially central portion of the disk space 53 from a sprue 55 formed on the upper die 52. After the molten resin is led to the disk space 53 from a pin gate 56, which is formed at a lower end of the sprue 55 when the molten resin is injected, the molten resin is filled into the cavity 57 through the film gate 54. In addition, a reserving recess 58 is formed substantially centrally of the columnar portion 59 of the lower die 51, and after the molten resin injected from the sprue 55 is once poured into the reserving recess 58, the molten resin flows uniformly into the disk space 53 from the reserving recess 58. In addition, since the columnar portion 59 of the lower die 51 cannot close the sealing fitting recess 35 formed on the other end side of the inner peripheral surface of the outer race 25, the molten resin is also filled into the sealing fitting recess 35 from the disk space 53. In addition, while FIG. 4A shows the cavity 57 (divided into the upper and lower dies at its topmost portion since the coating member 40 is arcuate in shape) formed by the lower die 51 and the upper die 52, only the lower die 51 or the upper die 52 may define a cavity 57 in the case where the arc of the coating member 40 has a large curvature.

When the molten resin is cooled in the forming dies 50, the coating member 40 is formed in the cavity 57, a gate runner 41 is formed in the film gate 54, the disk runner 42 is formed in the disk space 53, a sprue runner 43 is formed in the sprue 55, a runner 44 is formed in the reserving recess 58, and a sealing runner 45 is formed in the sealing fitting recess 35 as shown in FIGS. 4A and 4B. When the lower die 51 and the upper die 52 are parted from each other, the disk runner 42 and the sprue runner 43 are automatically cut from each other at the pin gate 56. In addition, the gate runner 41 is formed at an inclined, lower end of the disk runner 42, which is inclined from an outer periphery thereof.

As described above, when the lower die 51 and the upper die 52 are separated from each other and the outer race 25 is taken out of the lower die 51, the outer race is taken out in a state, in which the coating member 40, the disk runner 42, the gate runner 41, the runner 44, and the sealing runner 45 are fixed to the outer race 25. At this time, as shown in FIG. 4B, the gate runner 41 is made very thin by the projection 34 provided protrusively on the other end side of the outer peripheral surface of the outer race 25 and the sealing runner 45 is formed such that a projecting height H2 of an outer projection of the sealing fitting recess 35 is ½ or less than a depth H1 of the sealing fitting recess 35. In addition, while a portion between the projection 34 and the small flange 33 is formed to be low in the structure shown in the figure, the reason for this is that a thickness W is ensured there for the coating member 40 to prevent the coating member 40 from coming up when the gate runner 41 is cut.

Figure 5A:
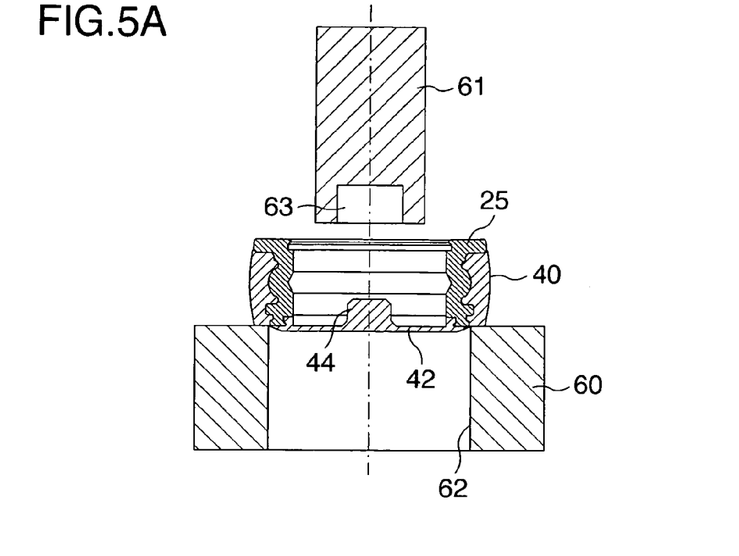
FIGS. 5A to 5C are cross sectional views showing a state, in which exclusive jigs for cutting of a disk runner of a molding are used.
Figure 5B:
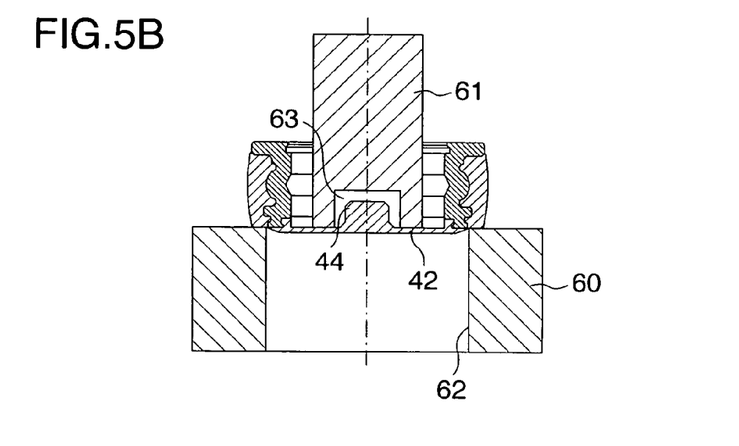
Figure 5C:
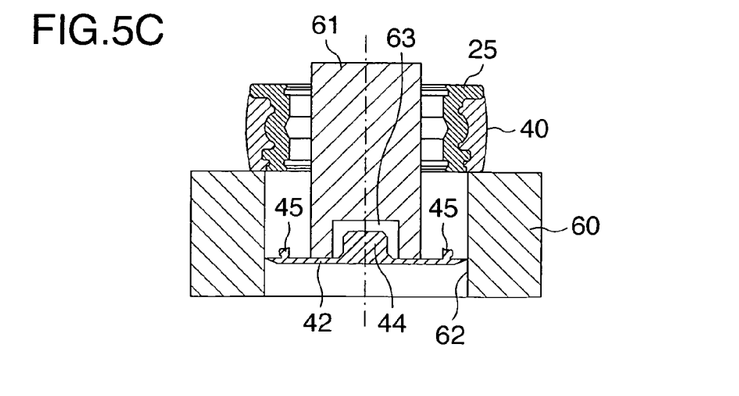

The outer race 25 taken out in a state, in which the coating member 40, the disk runner 42, the gate runner 41, the reservoir runner 44, and the sealing runner 45 are fixed thereto, is put so that the disk runner 42 abuts against a lower jig 60, which is an exclusive jig formed with an opening 62, as shown in FIG. 5A. Since the lower jig is formed so that a diameter of the opening 62 agrees with a diameter of the gate runner 41 when the outer race is thus put, the outer race can be put so that the gate runner 41 positioned at the inclined, lower end of the disk runner 42 is correctly fitted into the opening 62. In this state, an upper jig 61 (also, an exclusive jig) formed at a lower end surface thereof with a recess 63 is caused to descend toward a hole on the inner peripheral surface of the outer race 25 and the lower end surface of the upper jig 61 pushes a back surface side of the disk runner 42 in a state, in which the reservoir runner 44 is accommodated in the recess 63 as shown in FIG. 5B, whereby the disk runner 42 is cut at the gate runner 41 to be separated from the outer race 25 as shown in FIG. 5C. In addition, since the gate runner 41 is very thin, cutting at the gate runner 41 can be readily performed, and the sealing runner 45 is also removed together with the disk runner 42 as the disk runner 42 is separated. The reason for this is that the projecting height H2 of the outer projection of the sealing fitting recess 35 is ½ or less than the depth H1 of the sealing fitting recess 35.

Thus, since generation of burr at the cut surface of the gate runner 41 is suppressed on the resin coated outer race 25, from which unnecessary runner portions are removed, after working is not necessary, so that the resin coated bearing 20 can be assembled by fitting the inner ring 26 into the outer race 25 with the bearing balls 27 therebetween and fitting the rubber sealing rings 29 as sealing members into the sealing fitting recesses 35, 37 on the upper and lower surfaces of the bearing. Thereafter, it suffices to fit the support shaft 21 into the inner ring 26 to caulk and fix the same to the support member 11 as described above in the case where the resin coated bearing 20 is made use of as a guide roller.

In addition, while the embodiment has been described with respect to the case where the resin coated bearing 20 is assembled into the center guide roller mechanism 10, the invention can be also applied to a resin coated bearing, which is assembled into an upper guide roller mechanism or a lower guide roller mechanism, and made use of not only for a guide roller but also for a part, which uses a resin coated bearing.

The invention claimed is:

1. A method of producing a resin coated bearing by forming a coating member of a synthetic resin on an outer peripheral surface of a metallic outer race of a ball bearing by insert-molding, the outer race comprising a projection on one end on the outer peripheral surface thereof, and a sealing fitting recess on the one end side on an inner peripheral surface thereof, the sealing fitting recess including an outer projection on the one end side that projects inward of the outer race, wherein after the outer race is fitted onto a columnar portion provided on a first die of forming dies by inserting the columnar portion into a hole defined by the inner peripheral surface of the outer race, a second die of the forming dies is combined with the first die to cover the outer race so that:

a cavity is defined by an outer periphery of the outer race, the first and second dies;

a disk space in the form of a disk as viewed in plan view is defined between the columnar portion of the first die and the second die; and a film gate is defined by the projection on the outer peripheral surface of the outer race and the second die so as to provide communication between a whole edge of an outer periphery of the disk space and the cavity, and wherein a molten resin is injected toward a substantially central portion of the disk space from a sprue formed in the second die, and is led to the disk space from a pin gate which is formed at a lower end of the sprue, and then flows into a space between the columnar portion and the sealing fitting recess to form a sealing runner part, and into the cavity through the film gate to form the coating member.

2. The method of producing a resin coated bearing as defined in claim 1, wherein after the outer race provided with the coating member of the synthetic resin is taken out of the forming dies, a disk runner part of the synthetic resin filled in the disk space is cut by an exclusive jig from the coating member at a gate runner part of the synthetic resin formed in the film gate, and thereafter the outer race is fitted onto an inner ring with bearing balls therebetween.

3. The method of producing a resin coated bearing as defined in claim 2, wherein the projecting height of the outer projection of the sealing fitting recess is or less than the depth of the sealing fitting recess, and the resin coating bearing comprises a rubber sealing member fitted in the sealing fitting recess.

* * * * *